(12) United States Patent
Tsuruta et al.

(10) Patent No.: US 7,559,349 B2
(45) Date of Patent: Jul. 14, 2009

(54) PNEUMATIC TIRE WITH CIRCUMFERENTIAL AND TRANSVERSAL REINFORCEMENT LAYERS

(75) Inventors: Makoto Tsuruta, Kodaira (JP); Yuji Yamaguchi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 433 days.

(21) Appl. No.: 10/519,558

(22) PCT Filed: Jun. 24, 2003

(86) PCT No.: PCT/JP03/07983

§ 371 (c)(1),
(2), (4) Date: Dec. 28, 2004

(87) PCT Pub. No.: WO2004/002755

PCT Pub. Date: Jan. 8, 2004

(65) Prior Publication Data

US 2005/0241742 A1 Nov. 3, 2005

(30) Foreign Application Priority Data

Jun. 28, 2002 (JP) ............................. 2002-188876
Jun. 28, 2002 (JP) ............................. 2002-189092
Mar. 12, 2003 (JP) ............................. 2003-066699

(51) Int. Cl.
*B60C 9/22* (2006.01)
*B60C 9/20* (2006.01)
*B60C 9/18* (2006.01)

(52) U.S. Cl. .................... 152/527; 152/526; 152/531; 152/534

(58) Field of Classification Search .............. 152/531, 152/533, 527, 534, 526
See application file for complete search history.

(56) References Cited

U.S. PATENT DOCUMENTS

| | | | |
|---|---|---|---|
| 3,126,042 A | * | 3/1964 | Cegnar ........................ 152/533 |
| 3,842,884 A | | 10/1974 | Bertrand |
| 4,234,031 A | | 11/1980 | Pommier |
| 4,800,941 A | | 1/1989 | Kabe et al. |
| 5,054,532 A | * | 10/1991 | Kohno et al. ............. 152/531 X |
| 5,225,013 A | * | 7/1993 | Ohsawa et al. ........... 152/531 X |
| 5,271,445 A | * | 12/1993 | Kohno et al. ............. 152/531 X |
| 5,383,507 A | * | 1/1995 | Sato et al. ................ 152/531 X |
| 5,616,197 A | * | 4/1997 | Helfer et al. ................. 152/527 |

(Continued)

FOREIGN PATENT DOCUMENTS

EP 332449 A2 9/1989

(Continued)

*Primary Examiner*—Adrienne C Johnstone
(74) *Attorney, Agent, or Firm*—Sughrue Mion, PLLC

(57) ABSTRACT

A pneumatic tire to effectively enhance the transversal stiffness and prevented the carcass from breaking before the other reinforcement members break is provided. A tread rubber is arranged radially outwardly on the crown portion of the carcass. A belt consisting of at least one belt layer is arranged between the tread rubber and the carcass. The belt layer containing cords extending in a direction inclined from the tire's circumferential direction. At least one circumferential reinforcement layer containing meandering cords extending generally along the tire's circumferential direction in a wavy or zigzag shape is provided radially outwardly or inwardly on the belt or between the belt layers. At least one transversal reinforcement layer containing straight cords extending generally perpendicular to the tire's circumferential direction is provided on the position radially outwardly adjacent to the crown portion of the carcass.

12 Claims, 2 Drawing Sheets

U.S. PATENT DOCUMENTS 5,738,740 A * 4/1998 Cluzel .................... 152/531 X
6,367,527 B1 * 4/2002 Cluzel .................... 152/531 X
6,371,182 B1 * 4/2002 Philpott et al. .......... 152/531 X

FOREIGN PATENT DOCUMENTS

| EP | 0 890 455 A2 | * | 1/1999 |
| EP | 0 980 770 A2 | * | 2/2000 |
| JP | 62-261504 A | | 11/1987 |
| JP | 3-136905 A | | 6/1991 |
| JP | 3-176205 A | | 7/1991 |
| JP | 4-356203 A | | 12/1992 |
| JP | 6-048112 A | | 2/1994 |
| JP | 10044712 A | * | 2/1998 |
| JP | 11020405 A | * | 1/1999 |
| JP | 2000-062411 A | | 2/2000 |
| JP | 2000-203215 A | | 7/2000 |

* cited by examiner

PNEUMATIC TIRE WITH CIRCUMFERENTIAL AND TRANSVERSAL REINFORCEMENT LAYERS

TECHNICAL FIELD

The present invention relates to a pneumatic tire for heavy load having a tread portion whose transversal strength has been enhanced, and more specifically a pneumatic tire suitable for use in a truck or a bus.

BACKGROUND ART

A pneumatic tire for heavy load generally has a belt radially outwardly arranged on a carcass to reinforce a tread portion. The belt used is usually a crossing belt having multiple layers of which cords alternatively crossed with each other between the layers, or an inclined belt having a single belt layer of which cords are inclined to the tire's circumferential direction.

When such a tire is subjected to inflation pressure, a hoop effect of the belt becomes smaller at a tread shoulder portion than at a tread center portion and thus the amount of a radial growth of the belt at the tread shoulder portion becomes larger than that at the tread center portion. Consequently, the tread shoulder portion of the belt extensionally deforms relatively large in the circumferential direction, which causes a large circumferential strain on the tread rubber. As a result, there is a problem that a separation is apt to occur between the belt and the tread rubber.

Further, pneumatic tires for heavy load recently tend to have lower profiles in response to increasing demands for lowering a vehicle floor and making a drive shaft or a trailer shaft to be single wheeled instead of traditional dual wheeled. When such a low-profile tire, especially a tire having an aspect ratio of 70% or less is subjected to inflation pressure, the amount of the radial growth tends to further increase at the shoulder portion.

JP 2-208101A describes that a reinforcement layer containing meandering cords extending along the circumference direction in a wavy or zigzag shape is provided radially outwardly or inwardly on the belt or between the belt layers as a means for suppressing the radial growth of the belt at the tread shoulder portion, and it has been used up to now. This can suppress the radial growth of the belt at the tread shoulder portion, thereby improving the durability of the tread shoulder portion.

For the tires having such a configuration, it has been considered that the transversal stiffness is not necessarily reinforced during the inner pressure being applied, since a load of the circumferential tensile force is large while a load of the transversal tensile force is small during the inner pressure being applied. However, if an input such as a projection is penetrated, the tire is easily bent and pulled in the transversal direction due to its small transversal tensile stiffness, so that carcass cords, which are transversal members, are subjected to larger input forces. For example, when the tire receives a projection input caused by passing over a stone during running on the road, the tire tends to deform more in the transversal direction than in the circumferential direction as compared with the ordinal tire.

The term "projection input" herein refers to a radially inward force acting on the tread surface when a pneumatic tire runs on the road and passes over, for example, a stone.

When the tire having such a tendency runs while repeatedly incurring the projection input, the carcass which mainly contributes the transversal stiffness breaks prior to the belt which mainly contributes the circumferential stiffness. A problem is that the tire gets blowout and/or tread burst much easier in the case where the carcass breaks first than in the case where the belt breaks first.

Further, a demand for improving transport efficiency in the modern market needs enhancements of speed and load capacity of the vehicle. From this viewpoint also, the durability of the carcass may become problematic.

In this connection, it is recently noticed that, in order to improve the durability of the carcass against the projection input, the transversal stiffness of the tread portion may be enhanced to suppress the transversal deformation occurring at the time of receiving the projection input, thereby decreasing the input force per one cord in the carcass.

JP 2002-514538A, for example, describes a tire in which an additional ply having substantially radially arranged reinforcement elements of non-extensible metal is provided between belt layers. The tire, however, is provided with the transversal reinforcement layer between the belt layers, so that the effect of reinforcing the carcass is not sufficient. JP 4-356203A describes a tire comprising belt layers among which the inner most belt layer in the tire's radial direction is dividedly arranged with spacing the central region to form a split configuration, and a reinforcement layer in which radial cords are embedded, the reinforcement layer being arranged inside these belt layers in the tire's radial direction and along the carcass. The tire, however, has no reinforcement around the tire's equatorial plane at which largest deformation is observed at the time of receiving the projection input, so its durability is not sufficient. JP 2002-192910A describes a tire in which transversal reinforcement layers having cords extending at 50 to 90 degrees with respect to the tire's circumferential direction are arranged between a carcass and a belt and between the shoulder portion and the tire's equatorial plane. The object of the tire, however, is not an improvement of the durability, but an improvement of the drivability. In addition, the tire has no reinforcement around the tire's equatorial plane at which largest deformation is observed at the time of receiving the projection input, so its durability is not sufficient. Furthermore, in the tire for heavy load having such a belt configuration, the above-mentioned projection input is easily transmitted to the carcass and thus the ply cords are readily broken, which is problematic.

As a measure for enhancing a transversal stiffness of a tread portion, enlarging the diameter of carcass ply cords and increasing the number of carcass ply cords embedded in the carcass may be recited by way of example. However, these measures involve a demerit of increasing the weight of the whole tire, and a stepwise transition of the stiffness occurring at a rolled-up end of the carcass becomes greater, which involves another demerit of decreasing the durability at the rolled-up end of the carcass.

DISCLOSURE OF THE INVENTION

The present invention is directed to solve these problems which the conventional art has. The object of the present invention is to provide a pneumatic tire for heavy load which can prevent an increase of the weight of the whole tire although the tire adopts a configuration in which a reinforcement layer for enhancing the transversal stiffness is arranged to suppress a radial growth of a belt, as well as can effectively enhance the transversal strength without involving a decrease of the durability at the carcass ends, so that the carcass can be prevented from breaking before the other reinforcement members such as a belt and a reinforcement layer break.

A pneumatic tire according to the present invention comprises a carcass containing at least one toroidal carcass ply, a tread rubber arranged radially outwardly on the crown portion of the carcass, and a belt consisting of at least one belt layer arranged between the tread rubber and the carcass, the belt layer containing cords extending in a direction inclined from the tire's circumferential direction, wherein at least one circumferential reinforcement layer containing meandering cords extending generally along the tire's circumferential direction in a wavy or zigzag shape is provided radially outwardly or inwardly on the belt or between the belt layers, and at least one transversal reinforcement layer containing straight cords extending generally perpendicular to the tire's circumferential direction is provided radially outwardly on the position adjacent to the crown portion of the carcass.

The transversal reinforcement layer is provided radially outwardly on the position adjacent to the carcass in this tire, so that, when a projection input penetrates the carcass, the stiffness of the straight cords extending generally perpendicular to the tire's circumferential direction in the transversal reinforcement layer bears a transversal force near the carcass caused by the projection input to suppress a bending deformation and more effectively decrease a bending tensile deformation input acting on the carcass. As a result, the carcass can be prevented from breaking before the other reinforcement members such as the belt and the reinforcement layer break.

At least one circumferential reinforcement layer containing the meandering cords extending generally along the tire's circumferential direction in a wavy or zigzag shape is provided radially inwardly or outwardly on the belt or between the belt layers, so that the radial growth of the belt at the tread shoulder portion can be more effectively suppressed to prevent the separation between the belt and the tread rubber.

In addition, the transversal reinforcement layer is provided only on the crown portion of the carcass which needs to enhance its transversal strength, so that the increase in weight of the whole tire can be suppressed and the number of carcasses as well as the stepwise transition of the stiffness at the folding end can be reduced as compared with a tire having a structure in which a plurality of carcasses are used to obtain the similar transversal strength. As a result, the transversal strength can be more effectively enhanced.

In a preferred embodiment of the invention, the inclined angle of the straight cords of the transversal reinforcement layer with respect to the tire's circumferential direction may be within a range of 90±20 degrees.

According to this embodiment, the extending direction of the straight cords is set as close to perpendicular as possible with respect to the tire's circumferential direction, so that the transversal stiffness can be more effectively enhanced and the increase in weight of the tire can be more effectively suppressed.

On one hand, the optimal inclined angle of the straight cords with respect to the tire's circumferential direction is 90 degrees with considering only the transversal strength. On the other hand, when a tensile force occurs in the tire's circumferential direction in the molding process, the cords cannot bear the tensile force and, as a result, the arrangement of the cords tends to be disordered. The cord is preferably inclined from 90 degrees in order to prevent the disorder of the arrangement, but the transversal stiffness will suddenly drop if the inclined angle deviates from the range of 90±20 degrees. In the light of these characteristics, the suitable inclined angle is decided within the range of 90±20 degrees.

In another preferred embodiment of the invention, the sum of the transversal strengths of the carcass, the transversal reinforcement layer, the circumferential reinforcement layer and the belt including their coating rubbers may be 30 kN/25 mm or more at the tire's equatorial plane. According to this embodiment, the input penetrating the carcass cords which input is caused by the bending tensile deformation of the carcass due to the repeatedly occurring projection input can be reduced by improving the tensile strength of the whole tread portion. As a result, the carcass can be prevented from breaking before the other reinforcement members such as a belt and a reinforcement layer break.

In yet another preferred embodiment of the present invention, the ratio of the sum of the transversal strengths of the carcass, the transversal reinforcement layer, the circumferential layer and the belt including their coating rubbers to the sum of the circumferential strengths of them may be 0.55 or more at the tire's equatorial plane.

According to this embodiment, the bending tensile deformation of the carcass due to the repeatedly occurring projection input can be reduced, and the deformation of the carcass in the tire's transversal direction and the deformations of the belt and the circumferential reinforcement layer in the tire's circumference direction can be appropriately balanced, so that the carcass can be prevented from breaking before the other reinforcement members such as a belt and a reinforcement layer break.

The transversal strength of each layer can be expressed by the following equation, where θ is the inclined angle of cords contained in each of the carcass, the transversal reinforcement layer, the circumferential reinforcement layer and the belt with respect to the tire's circumferential direction;

[the transversal strength of each layer]=[the strength of each cord]($N$)×[the number of cords embedded](the number of cords/25 mm)×(sin θ)$^2$ The transversal strengths are calculated for each of the carcass, the transversal reinforcement layer, the circumferential reinforcement layer and the belt, and the results are summed to give the transversal strength of the tire at the equatorial plane.

The circumferential strength of each layer can be similarly expressed by the following equation;

[the circumferential strength of each layer]=[the strength of each cord]($N$)×[the number of cords embedded](the number of cords/25 mm)×(cos θ)$^2$ The circumferential strengths are calculated for each of the carcass, the transversal reinforcement layer, the circumferential reinforcement layer and the belt, and the results are summed to give the circumferential strength of the tire at the equatorial plane.

In a further preferred embodiment of the invention, the belt may consist of one belt layer, and the inclined angle of the cords of the belt layer with respect to the tire's circumferential direction may be 10 to 60 degrees.

According to this embodiment, the tensile force of the cords of the belt layer can bear the forces in the tire's transversal and circumferential directions. Therefore, a transversal force required for the cornering and a traction force during the acceleration or deceleration can be ensured. In addition, the tensile force of the cords of the belt layer can widely scatter an impact and a deformation which are locally generated on the tread's grounding face.

As an alternative to the above-mentioned belt, the belt may consist of two or more belt layers; the cords of the adjacent belt layers cross each other; the inclined angle of the cords of the belt layers with respect to the tire's circumferential direction is 10 to 60 degrees; and the cords of the radially adjacent belt layers extend in the mutually opposite directions with respect to the tire's circumferential direction.

According to this embodiment, the tensile force of the cords of the two or more belt layer can bear the force in the tire's transversal and circumferential directions more effectively than in the case where the belt consists of one belt layer. Therefore, a transversal force required for the cornering and a traction force during the acceleration or deceleration can be further ensured, as well as an impact and a deformation, which are locally generated on the tread's grounding face, can be more widely scattered.

Preferably, the width of the transversal reinforcement layer is 0.35 times or more as large as the tread width. According to this configuration, the transversal strength of a region having a width of 0.3 times of the tread width with the tire's equatorial plane as its center, where the reinforcement layer is likely to be damaged by the projection input, can be reinforced by the transversal reinforcement layer.

As used herein, the term "tread width" refers to the maximum grounding width measured when the tire is mounted on a standard rim specified in a specification such as TRA, ETRTO and JATMA, air is applied to give a inner pressure corresponding to the maximum load for single wheel of the applicable size defined in the specification, and the maximum load for single wheel of the applicable size defined in the specification is loaded.

The width of the transversal reinforcement layer is preferably 0.95 times or less as large as the tread width. This enlarges the amount of a compressive deformation in the tire's radial direction at the tread ends. So the tread rubber is pushed out to deform in the tread's width direction, and the tread rubber near the transversal ends of the transversal reinforcement layer follows the deformation and is pulled outward in the tread's width direction, which can prevent a separation between the transversal ends of the transversal reinforcement layer and the tread rubber.

The straight cords constituting the transversal reinforcement layer are preferably non-extensible cords. This enlarges an initial resistance force against the projection input, so that the cords of carcass ply can be effectively prevented from breaking even in the case of the projection input having a large initial pressing force.

Alternatively, the straight cords constituting the transversal reinforcement layer may be extensible cords having an initial elongation of 0.2% or more. This enables the transversal reinforcement layer to bendingly deform and wrap around the projection, so that the carcass ply can be prevented from breaking.

The reason is discussed here. There is a positive relationship between the strength of the cords of the carcass ply and the plunger characteristics. The plunger characteristics are quantified as energy defined by the area of the triangle surrounded by the pressing force-stroke diagram in FIG. 3. Thus, in order to improve the plunger characteristics, at least one of the maximum pressing force and the maximum stroke until the tire is broken may be enlarged to increase the above-mentioned area. Accordingly, if the transversal reinforcement layer is configured by using the extensible cords having an initial elongation of 0.2% or more, the maximum stroke becomes larger and thus the plunger characteristics can be improved. As a result, the cords of a carcass ply can be effectively prevented from breaking.

If the cords of the carcass ply have to be further prevented from being damaged by the projection input, the initial elongation of the straight cord is preferably 0.7% or more. The larger the initial elongation of the straight cord is, the greater the maximum stroke becomes, whereby the plunger characteristics is expected to be improved.

The straight cords constituting the transversal reinforcement layer are preferably extensible organic fiber cords. This reduces the stepwise transition of the stiffness at the ends of the straight cord, so that the transversal reinforcement layer easily follows a deformation at the time of applying a heavy load and a separation from the ends is unlikely to occur.

Alternatively, instead of using organic fiber cords, the straight cords constituting the transversal reinforcement layer may be extensible steel cords. This particularly enhances the bending stiffness.

BEST MODE FOR CARRYING OUT THE INVENTION

Hereinafter, illustrative embodiments of the invention will be described with reference to the attached drawings.

Figure 1:
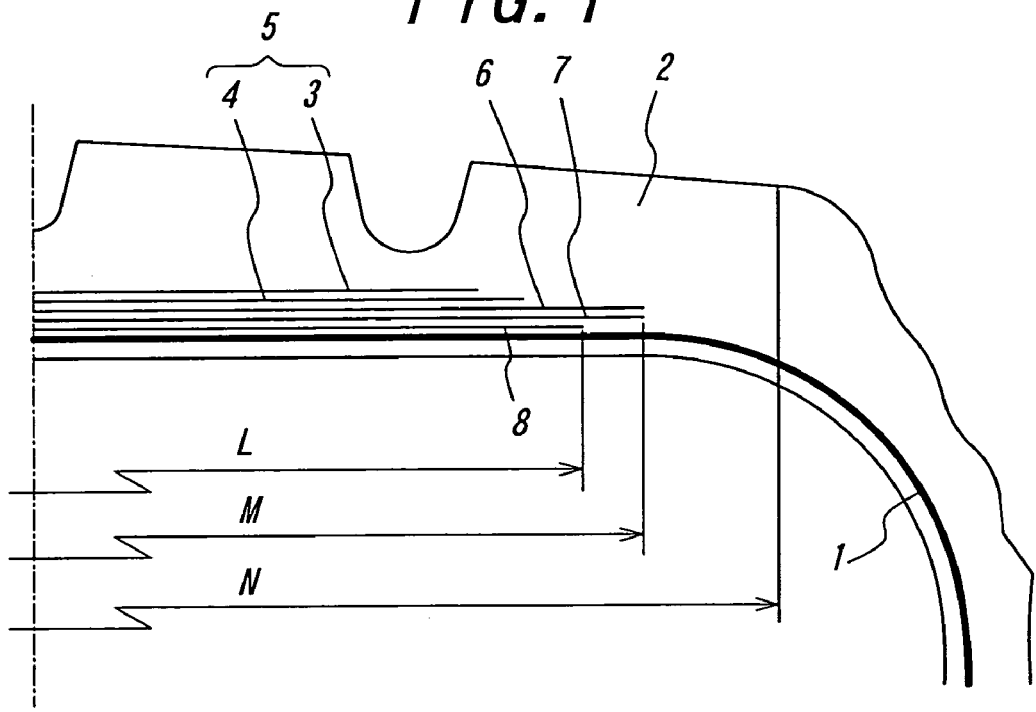
FIG. 1 is a half sectional view of a tread portion in the transversal direction, showing a tire according to one embodiment of the invention.

FIG. 1 is a half sectional view of a tread portion in the transversal direction, showing a tire according to one embodiment of the invention. In this figure, the reference numeral 1 denotes a carcass, and the reference numeral 2 denotes a tread rubber arranged radially outwardly on the crown portion of the carcass.

In this case, a belt 5 consisting of two belt layers 3, 4 is arranged between the tread rubber 2 and the carcass 1 which toroidally extends between not-shown bead cores. There are also provided two circumferential reinforcement layers 6, 7 radially inwardly adjacent to the belt 5 and a transversal reinforcement layer 8 radially outwardly adjacent to the carcass 1.

Figure 2:
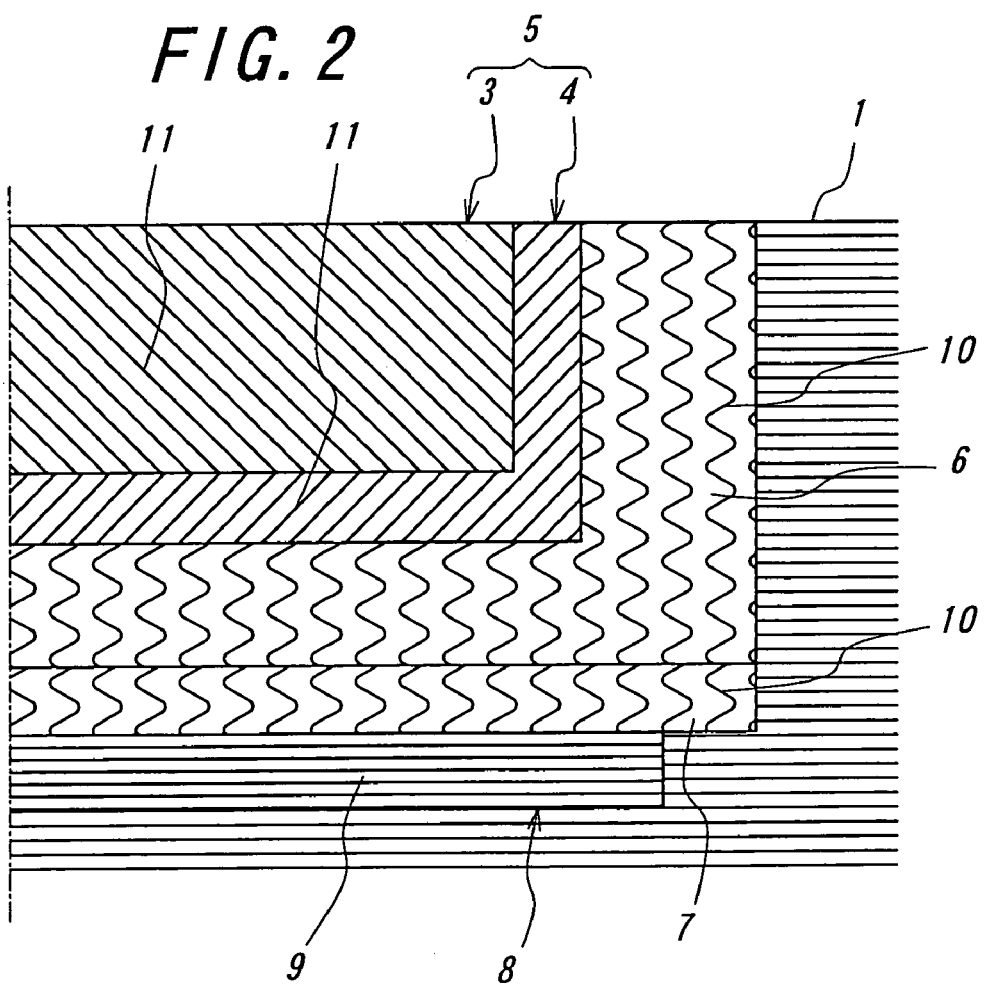
FIG. 2 is a development of the tire shown in FIG. 1, showing its reinforcement structure of the tread portion.
Figure 3:
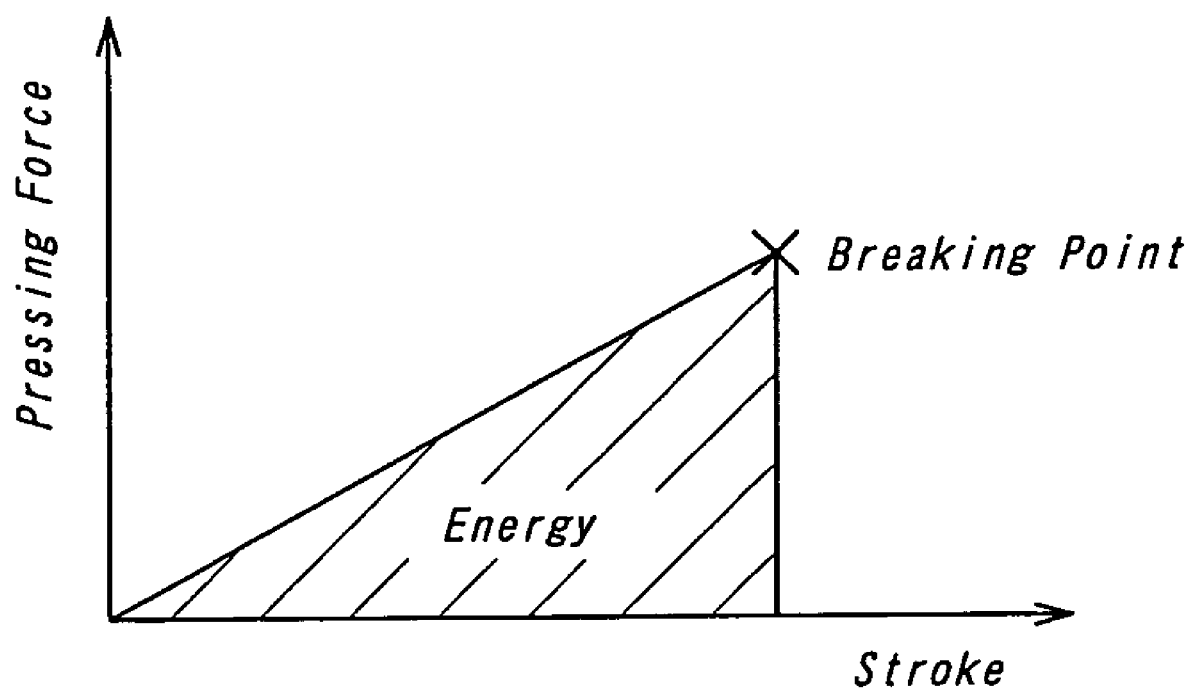
FIG. 3 is a pressing force-stroke diagram showing plunger characteristics.

FIG. 2 is a development of the tire shown in FIG. 1, showing its reinforcement structure of the tread portion.

A plurality of straight cords 9 extending generally perpendicular to the tire's circumferential direction are embedded in the transversal reinforcement layer 8 and are coated with coating rubber.

The inclined angle of the straight cords 9 with respect to the tire's circumferential direction is within a range of 90±20 degrees. One of the reasons of this is that the optimum inclined angle is 90 degrees with considering only the transversal strength. On the other hand, when a tensile force occurs in the tire's circumferential direction during the molding process, the cords cannot bear the tensile force and, as a result, the arrangement of the cords tends to be disordered. The cord is preferably inclined from 90 degrees in order to prevent the disorder of the arrangement, but the transversal stiffness will suddenly drop if the inclined angle deviates from the range of 90±20 degrees. In the light of these characteristics, the suitable inclined angle is decided within the range of 90±20 degrees.

When the projection input penetrates, the strength of the straight cords 9 of the transversal reinforcement layer 8 bears the force near the carcass due to the projection input to be able to more effectively reduce the bending deformation input to the carcass 1. Thus, the carcass 1 can be prevented from breaking before the other reinforcement members such as a belt and a reinforcement layer break.

In addition, the transversal reinforcement layer 8 is provided only on the crown portion of the carcass where the transversal strength has to be enhanced, so the increase in weight of the whole tire is minimized as compared with the case where the cords of the carcass ply themselves are made larger in their diameter or the case where the number of the cords embedded in the carcass ply is increased. As the result, the transversal strength can be effectively enhanced without causing a deterioration of the durability due to the increase of the stepwise transition of the stiffness at the rolled-up end, and thereby more effectively enhancing the transversal strength.

The circumferential reinforcement layers 6, 7 contain a plurality of non-extensible meandering cords made of, for example, steel or aramid fiber. The cords extend in a wavy or zigzag shape, such as a triangular wave, a square wave or a sinusoidal wave, with respect to the tire's circumferential direction at the same amplitude and cycle and at different phases. Also, the cords are coated with coating rubber.

With these layers, the amount of a radial growth at the shoulder portion of a low-profile tire can be suppressed under the condition of being pressurized by air. Further, as the meandering cords extend in a wavy or zigzag shape, a radial expansion during the manufacturing process can be ensured.

Moreover, by stacking the circumferential reinforcement layers 6, 7, the layers containing the meandering cords 10 extending generally along the tire's circumferential direction in a wavy or zigzag shape are overlapped with each other, so that, when viewed from the outward in the tire's circumferential direction, the arranged meandering cords 10 have different phases with respect to the circumferential direction between the layers and overlap with each other to form a mesh.

In the belt layer 3, a plurality of belt layer cords 11 leaning to the left with respect to the tire's circumferential direction are arranged and they are coated with the coating rubber. In the belt layer 4, a plurality of belt layer cords 11 are arranged to be leaned to the right at the same angle with respect to the tire's circumferential direction as that of the belt layer cords 11 in the belt layer 3 with respect to the tire's circumferential direction, and they are coated with the coating rubber.

In this case, the sum of the transversal strengths of the carcass 1, the transversal reinforcement layer 8, the circumferential reinforcement layers 6, 7 and the belt layers 3, 4 including their coating rubbers are 34 kN/25 mm at the tire's equatorial plane, which is greater than 30 kN/25 mm.

The ratio of the sum of the transversal strengths of the carcass 1, the transversal reinforcement layer 8, the circumferential reinforcement layers 6, 7 and the belt layers 3, 4 including their coating rubbers to the sum of the circumferential strengths of them are 0.9 at the tire's equatorial plane, which is greater than 0.55.

More preferably, the inclined angles of each of belt layer cords 11 with respect to the tire's circumferential direction are 10 to 40 degrees.

In this case, the belt 5 is formed by two belt layers 3, 4 and the inclined angle of the belt layer cord with respect to the tire's circumferential direction is 10 to 60 degrees.

Alternatively, instead of using the above-mentioned belt, the belt may be formed by one belt layer, and the inclined angle of the belt layer cords with respect to the tire's circumferential direction may be 10 to 60 degrees.

Preferably, a not-shown protective layer in which not-shown protective layer cords are arranged at an inclined angle of 40 to 80 degrees with respect to the circumferential direction and which are coated with the coating rubber are provided radially outwardly on the belt layer 3, 4.

With this protective layer, the tensile force of the protective layer cords can bear the force due to the projection input and thus can reduce the projection input to the belt layer cords 11 of the radially outermost belt layer 3 of the belt 5 to prevent the belt layer cords 11 or the meandering cords 10 from breaking. In addition, the inclined angle of the protective layer cords with respect to the tire's circumferential direction is equal to or more than the inclined angle of the belt layer cords 11 with respect to the tire' circumferential direction, so that the amount of the tensile force borne by the protective layer itself can be reduced and the protective layer can be prevented from breaking.

The circumferential reinforcement layers 6, 7 arranged radially inwardly on the belt 5 is shown here by way of example, but they may be arranged radially outwardly or between the belt layers.

More preferably, the width L of the transversal reinforcement layer 8 is set to be 0.35 times or more of the tread width N.

According to this configuration, the transversal strength of a region having a width of 0.3 times of the tread width with the tire's equatorial plane as its center, where the reinforcement layer is likely to be damaged by the projection input, can be reinforced by the transversal reinforcement layer.

More preferably, the width L of the transversal reinforcement layer 8 is set to be 0.95 times or less of the tread width N.

This enlarges the amount of a compressive deformation in the tire's radial direction at the tread ends. So the tread rubber is pushed out to deform in the tread's width direction, and the tread rubber near the transversal ends of the transversal reinforcement layer follows the deformation and is pulled outward in the tread's width direction, which can prevent a separation between the transversal ends of the transversal reinforcement layer and the tread rubber.

The straight cords 9 constituting the transversal reinforcement layer 8 are preferably non-extensible cords such as made of steel or aramid fiber. This suppresses the amount of a radial growth of a low-profile tire under the condition of being pressurized by air.

Alternatively, instead of using the non-extensible cords, the straight cords 9 constituting the transversal reinforcement layer 8 may be extensible cords having an initial elongation of 0.2% or more. This enables the transversal reinforcement layer to bendingly deform and wrap around the projection, so that the carcass ply can be prevented from breaking The straight cords 9 constituting the transversal reinforcement layer 8 are preferably extensible organic fiber cords such as aramid fiber, polyethylene naphthalate (PEN), and polyethylene terephthalate (PET). This reduces the stepwise transition of the stiffness at the ends of the straight cord, so that the transversal reinforcement layer easily follows a deformation at the time of applying a heavy load and a separation from the ends is unlikely to occur.

Alternatively, instead of using organic fiber cords, the straight cords 9 constituting the transversal reinforcement layer 8 may be extensible steel cords. This particularly enhances the bending stiffness.

EXAMPLES

Example 1

As an example of the invention, low-profile pneumatic tires for heavy load having tire sizes of 435/45 R22.5 and 285/60

R22.5 are prepared for the purpose of evaluating their characteristics of preventing precedent breakings of the carcass when a projection input penetrates a pneumatic tire for heavy load which has a transversal reinforcement layer radially outwardly adjacent to the carcass, and a circumferential reinforcement layer arranged radially outwardly or inwardly on a belt or between belt layers. The tires are mounted on rims having rim sizes of 14.00×22.5 and 9.00×22.5, respectively, and air is applied to them to give the internal pressure of 900 kPa. A hemispheric projection having a diameter of 40 mm is pressed against the tread portion at the tire's equatorial plane. After any one reinforcement layers among the carcass, the belt, the circumferential reinforcement layer, or the transversal reinforcement layer breaks, the presence of the precedent breaking of the carcass is examined and the energy applied until any of the reinforcement layer breaks (hereinafter referred to as breaking energy) is measured. The latter is evaluated by an index calculated with the breaking energy of the after-mentioned comparative example 3 as a control. The breaking energy is obtained by performing integration of the pressing force of the above-mentioned hemispheric projection to the amount of pressing at which the reinforce layer breaks. The results are shown in Tables 1 to 5.

Also, for the purpose of evaluating the effect of the ratio of the width of the transversal reinforcement layer to the tread width on the suppression of cracks of the tread rubber at the transversal ends of the transversal reinforcement layer in the above-mentioned tire, a running test on a drum is conducted at the inner pressure of 900 kPa under loading conditions of 63.7 kN (which is the standard load×1.3) for the tire having the tire size of 435/45 R22.5 and 40.2 kN (which is the standard load×1.3) for the tire having the tire size of 285/60 R22.5, and the presence of cracks of the tread rubber at the transversal ends of the transversal reinforcement layer is measured after running 10,000 km. The results are also shown in Tables 1 to 5.

The greater the index of the breaking energy in Tables 1 to 5 is, the higher the durability for the repeated projection input is.

Depending on the presence of the transversal reinforcement layer, the width of the transversal reinforcement layer, the ratio of the width of the transversal reinforcement layer to the tread width, the inclined angle of the straight cords of the transversal reinforcement layer with respect to the tire's circumferential direction, the number and the position of the circumferential reinforcement layer, the width of the circumferential reinforcement layer, the number of belt layer, the inclined angle of the belt layer cords with respect to the tire's circumferential direction, the presence of the protective layer, the inclined angel of the protective layer cords with respect to the tire's circumferential direction, the sum of the transversal strength at the tire's equatorial plane, the ratio of the transversal strength to the circumferential strength, and the presence of the extensibility of the straight cords, all of which are shown in Tables 1 to 5, sixteen examples and six comparative examples are prepared and subjected to the test.

TABLE 1

| | 435/45R22.5 | |
|---|---|---|
| | Comparative Example 1 | Comparative Example 2 |
| Structure (Inclined angle of each cord, width of each layer) | Cir. reinf. layer 1(0, 330) Cir. reinf. layer 2(0, 330) Belt layer 1(R20, 210) Belt layer 2(L20, 190) | Cir. reinf. layer 1(0, 330) Cir. reinf. layer 2(0, 330) Belt layer 1(R52, 210) Belt layer 2(L52, 190) |
| Sum of transversal strengths at tire's equatorial plane | 16.3 | 17.7 |
| Transversal strength/ circumferential strength | 0.23 | 0.53 |
| Breaking energy | 76 | 100 |
| Presence of preceding break of carcass | Yes | Yes |
| Trans. reinf. layer width/tread width | — | — |
| Presence of break at ends of trans. reinf. layer during drum testing | — | — |
| Straight cord constituting trans. reinf. layer | Non-expansible steel cord | Non-expansible steel cord |
| | Example 1 | Example 2 |
| Structure (Inclined angle of each cord, width of each layer) | Trans. reinf. layer (90, 160) Cir. reinf. layer (0, 330) Cir. reinf. layer (0, 330) Belt layer 1(R20, 210) Belt layer 2(L20, 190) | Trans. reinf. layer (90, 160) Cir. reinf. layer (0, 330) Cir. reinf. layer (0, 330) Belt layer 1(R20, 210) Belt layer 2(L20, 190) |
| Sum of transversal strengths at tire's equatorial plane | 25.4 | 30.8 |
| Transversal strength/ circumferential strength | 0.43 | 0.51 |
| Breaking energy | 112 | 118 |
| Presence of preceding break of carcass | None | None |
| Trans. reinf. layer width/tread width | 0.42 | 0.42 |
| Presence of break at ends of trans. reinf. layer during drum testing | None | None |
| Straight cord constituting trans. reinf. layer | Non-expansible steel cord | Non-expansible steel cord |

TABLE 2

| | 435/45R22.5 | |
|---|---|---|
| | Example 3 | Example 4 |
| Structure (Inclined angle of each cord, width of each layer) | Trans. reinf. layer (90, 160) Cir. reinf. layer 1(0, 330) Cir. reinf. layer 2(0, 330) Belt layer 1(R52, 210) Belt layer 2(L52, 190) | Trans. reinf. layer (90, 260) Cir. reinf. layer 1(0, 330) Cir. reinf. layer2 (0, 330) Belt layer 1(R52, 210) Belt layer 2(L52, 190) |
| Sum of transversal strengths at tire's equatorial plane | 31.4 | 34 |
| Transversal strength/circumferential strength | 0.84 | 0.9 |
| Breaking energy | 132 | 148 |
| Presence of preceding break of carcass | None | None |
| Trans. reinf. layer width/tread width | 0.42 | 0.68 |
| Presence of break at ends of trans. reinf. layer during drum testing | None | None |
| Straight cord constituting trans. reinf. layer | Non-expansible steel cord | Non-expansible steel cord |
| | Example 5 | Example 6 |
| Structure (Inclined angle of each cord, width of each layer) | Trans. reinf. layer (90, 260) Cir. reinf. layer 1(0, 330) Cir. reinf. layer 2(0, 330) Belt layer 1(R52, 210) Belt layer 2(L52, 190) | Trans. reinf. layer (90, 380) Cir. reinf. layer 1(0, 330) Cir. reinf. layer 2(0, 330) Belt layer 1(R52, 210) Belt layer 2(L52, 190) |
| Sum of transversal strengths at tire's equatorial plane | 40.1 | 40.1 |
| Transversal strength/circumferential strength | 1.05 | 1.05 |
| Breaking energy | 159 | 159 |
| Presence of preceding break of carcass | None | None |
| Trans. reinf. layer width/tread width | 0.68 | 1.00 |
| Presence of break at ends of trans. reinf. layer during drum testing | None | Yes |
| Straight cord constituting trans. reinf. layer | Non-expansible steel cord | Non-expansible steel cord |
| | Example 7 | Example 8 |
| Structure (Inclined angle of each cord, width of each layer) | Trans. reinf. layer (90, 260) Cir. reinf. layer 1(0, 330) Cir. reinf. layer 2(0, 330) Belt layer 1(R52, 210) Belt layer 2(L52, 190) | Trans. reinf. layer (90, 260) Cir. reinf. layer 1(0, 330) Cir. reinf. layer 2(0, 330) Belt layer 1(R52, 210) Belt layer 2(L52, 190) |
| Sum of transversal strengths at tire's equatorial plane | 32 | 32 |
| Transversal strength/circumferential strength | 0.85 | 0.56 |
| Breaking energy | 142 | 132 |
| Presence of preceding break of carcass | None | None |
| Trans. reinf. layer width/tread width | 0.68 | 0.68 |
| Presence of break at ends of trans. reinf. layer during drum testing | None | None |
| Straight cord constituting trans. reinf. layer | Non-expansible steel cord | Non-expansible steel cord |

TABLE 3

| | 435/45R22.5 | |
|---|---|---|
| | Comparative Example 3 | Example 9 |
| Structure (Inclined angle of each cord, width of each layer) | Cir. reinf. layer 1(0, 300) Cir. reinf. layer 2(0, 300) Belt layer 1(L52, 370) | Trans. reinf. layer (90, 260) Cir. reinf. layer 1(0, 300) Cir. reinf. layer 2(0, 300) Belt layer 1(L52, 370) |
| Sum of transversal strengths at tire's equatorial plane | 16.3 | 34 |
| Transversal strength/circumferential strength | 0.46 | 0.9 |
| Breaking energy | 94 | 142 |
| Presence of preceding break of carcass | Yes | None |
| Trans. reinf. layer width/tread width | — | 0.68 |

TABLE 3-continued

| 435/45R22.5 | | |
|---|---|---|
| Presence of break at ends of trans. reinf. layer during drum testing | — | None |
| Straight cord constituting trans. reinf. layer | Non-expansible steel cord | Non-expansible steel cord |

| | Comparative Example 4 | Example 10 |
|---|---|---|
| Structure (Inclined angle of each cord, width of each layer) | Cir. reinf. layer 1(0, 300)<br>Cir. reinf. layer 2(0, 300)<br>Belt layer 1(R52, 370)<br>Belt layer 2(L52, 210) | Trans. reinf. layer (90, 260)<br>Cir. reinf. layer 1(0, 300)<br>Cir. reinf. layer 2(0, 300)<br>Belt layer 1(R52, 370)<br>Belt layer 2(L52, 210) |
| Sum of transversal strengths at tire's equatorial plane | 16.3 | 34 |
| Transversal strength/circumferential strength | 0.53 | 0.9 |
| Breaking energy | 102 | 147 |
| Presence of preceding break of carcass | Yes | None |
| Trans. reinf. layer width/tread width | — | 0.68 |
| Presence of break at ends of trans. reinf. layer during drum testing | — | None |
| Straight cord constituting trans. reinf. layer | Non-expansible steel cord | Non-expansible steel cord |

| | Comparative Example 5 | Example 11 |
|---|---|---|
| Structure (Inclined angle of each cord, width of each layer) | S.belt layer(R60, 130–190)<br>Cir. reinf. layer 1(0, 330)<br>Cir. reinf. layer 2(0, 330)<br>Belt layer 1(R52, 210)<br>Belt layer 2(L52, 190) | Trans. reinf. layer (90, 260)<br>S.belt layer(R60, 130–190)<br>Cir. reinf. layer 1(0, 330)<br>Cir. reinf. layer 2(0, 330)<br>Belt layer 1(R52, 210)<br>Belt layer 2(L52, 190) |
| Sum of transversal strengths at tire's equatorial plane | 17.7 | 34 |
| Transversal strength/circumferential strength | 0.53 | 0.9 |
| Breaking energy | 101 | 150 |
| Presence of preceding break of carcass | Yes | None |
| Trans. reinf. layer width/tread width | — | 0.68 |
| Presence of break at ends of trans. reinf. layer during drum testing | — | None |
| Straight cord constituting trans. reinf. layer | Non-expansible steel cord | Non-expansible steel cord |

TABLE 4

| 285/60R22.5 | | |
|---|---|---|
| | Comparative Example 6 | Example 12 |
| Structure (Inclined angle of each cord, width of each layer) | Cir. reinf. layer 1(0, 160)<br>Cir. reinf. layer 2(0, 160)<br>Belt layer 1(R20, 240)<br>Belt layer 2(L20, 220)<br>Belt layer 3(L20, 120) | Trans. reinf. layer (90, 120)<br>Cir. reinf. layer 1(0, 160)<br>Cir. reinf. layer 2(0, 160)<br>Belt layer 1(R20, 240)<br>Belt layer 2(L20, 220)<br>Belt layer 3(L20, 120) |
| Sum of transversal strengths at tire's equatorial plane | 17.7 | 40.1 |
| Transversal strength/circumferential strength | 0.25 | 0.63 |
| Breaking energy | 100 | 135 |
| Presence of preceding break of carcass | Yes | None |
| Trans. reinf. layer width/tread width | — | 0.5 |
| Presence of break at ends of trans. reinf. layer during drum testing | — | None |
| Straight cord constituting trans. reinf. layer | Non-expansible steel cord | Non-expansible steel cord |

| | Example 13 | Comparative Example 7 |
|---|---|---|
| Structure (Inclined angle of each cord, width of each layer) | Trans. reinf. layer (90, 180)<br>Cir. reinf. layer 1(0, 160)<br>Cir. reinf. layer 2(0, 160)<br>Belt layer 1(R20, 240) | Belt layer 1(R20, 240)<br>Belt layer 2(L20, 220)<br>Cir. reinf. layer 1(0, 170)<br>Cir. reinf. layer 2(0, 170) |

TABLE 4-continued

285/60R22.5

|  | Belt layer 2(L20, 220) Belt layer 3(L20, 120)) | Belt layer 3(L20, 170) |
|---|---|---|
| Sum of transversal strengths at tire's equatorial plane | 40.1 | 17.7 |
| Transversal strength/circumferential strength | 0.63 | 0.25 |
| Breaking energy | 139 | 100 |
| Presence of preceding break of carcass | None | Yes |
| Trans. reinf. layer width/tread width | 0.75 | — |
| Presence of break at ends of trans. reinf. layer during drum testing | None | — |
| Straight cord constituting trans. reinf. layer | Non-expansible steel cord | Non-expansible steel cord |

|  | Example 14 |
|---|---|
| Structure (Inclined angle of each cord, width of each layer) | Trans. reinf. layer(90, 180) Belt layer 1(R20, 240) Belt layer 2(L20, 220) Cir. reinf. layer 1(0, 170) Cir. reinf. layer 2(0, 170) Belt layer 3(L20, 170) |
| Sum of transversal strengths at tire's equatorial plane | 40.1 |
| Transversal strength/circumferential strength | 0.63 |
| Breaking energy | 136 |
| Presence of preceding break of carcass | None |
| Trans. reinf. layer width/tread width | 0.75 |
| Presence of break at ends of trans. reinf. layer during drum testing | None |
| Straight cord constituting trans. reinf. layer | Non-expansible steel cord |

TABLE 5

285/60R22.5

|  | Example 15 | Example 16 |
|---|---|---|
| Structure (Inclined angle of each cord, width of each layer) | Trans. reinf. layer (90, 180) Belt layer 1(R20, 240) Belt layer 2(L20, 220) Cir. reinf. layer 1(0, 170) Cir. reinf. layer 2(0, 170) Belt layer 3(L20, 170) | Trans reinf. layer (90, 180) Belt layer 1(R20, 240) Belt layer 2(L20, 220) Cir. reinf. layer 1(0, 170) Cir. reinf. layer 2(0, 170) Belt layer 3(L20, 170) |
| Sum of transversal strengths at tire's equatorial plane | 40.1 | 40.1 |
| Transversal strength/circumferential strength | 0.63 | 0.63 |
| Breaking energy | 140 | 142 |
| Presence of preceding break of carcass | None | None |
| Trans. reinf. layer width/tread width | 0.75 | 0.75 |
| Presence of break at ends of trans. reinf. layer during drum testing | None | None |
| Straight cord constituting trans. reinf. layer | Expansible organic fiber cord (initial elongation 0.7%) | Expansible steel cord (initial elongation 0.7%) |

In Table 1, comparing Example 1 with Comparative example 1, it shows that, as Example 1 is provided with a transversal reinforcement layer, the carcass is prevented from breaking before the other reinforcement layers break, the breaking energy is enhanced and the durability against the repeated projection input is improved.

Comparing Example 1 with Example 2, it shows that the breaking energy can be increased by setting the sum of the transversal strength to 30 kN/25 mm or more at the tire's equatorial plane.

In Tables 1 and 2, comparing Example 2 with Example 3, it shows that the breaking energy is further effectively increased by setting the ratio of the transversal strength to the circumferential strength to 0.55 or more.

In Table 2, comparing Example 3 with Example 4, it shows that the breaking energy is further increased by widening the width of the transversal reinforcement layer.

Comparing Example 4 with Example 5, the breaking energy is increased by raising the ratio of the transversal strength/the circumferential strength even for the tires having the same configuration.

Comparing Example 5 with Example 6, it shows that if the ratio of the width of the transversal reinforcement layer to the tread width is more than 0.95, the durability of the tread rubber near the transversal ends of the transversal reinforcement layer, so that the ratio of the width of the transversal reinforcement layer to the tread width is preferably 0.95 or less.

In Table 3, comparing Comparative example 3 with Example 9, it shows that arranging the transversal reinforcement layer gives higher transversal strength and larger breaking energy as well as prevents the carcass from precedingly breaking even for the tire having a structure in which there is only one belt layer.

Comparing Comparative example 4 and Example 10, it shows that arranging the transversal reinforcement layer gives higher transversal strength and larger breaking energy as well as prevents the carcass from precedingly breaking even for the tire having a structure in which one of the belt layers is a wide belt layer.

Comparing Comparative example 5 with Example 11, it shows that arranging the transversal reinforcement layer gives higher transversal strength and larger breaking energy as well as prevents the carcass from precedingly breaking even for the tire adopting split belts.

In Table 4, comparing Comparative example 6 with Examples 12 and 13, it shows that arranging the transversal reinforcement layer gives higher transversal strength and larger breaking energy as well as prevents the carcass from precedingly breaking even for the tire having three belt layers.

Comparing Comparative example 7 with Example 14, it shows that arranging the transversal reinforcement layer gives higher transversal strength and larger breaking energy as well as prevents the carcass from precedingly breaking even for the tire in which the transversal reinforcement layer arranged radially outwardly on a belt layer and another belt layer is arranged radially outwardly on the transversal reinforcement layer.

In Tables 4 and 5, comparing Example 14 with Examples 15 and 16, the breaking energy is further increased, as the straight cords are extensible.

INDUSTRIAL APPLICABILITY

As clearly shown in the above description, the present invention can suppress an increase of the weight of the whole tire, does not involve a decrease of the durability at the carcass ends, and can prevent the transversal stiffness from being smaller than the circumferential stiffness even for a low-profile tire in which the circumferential reinforcement layer is arranged to suppress the radial growth of the tread at the shoulder portion, since the transversal reinforcement layer is arranged radially outwardly on the crown portion of the carcass. Therefore, even when the tire receives a projection input caused by passing over a stone during the running on the road, the carcass can be prevented form breaking before the belt or the circumferential reinforcement layer break.

The invention claimed is:

1. A pneumatic tire, comprising:
a carcass containing at least one toroidal carcass ply,
a tread rubber arranged radially outwardly on the crown portion of the carcass, and
a belt consisting of at least one belt layer arranged between the tread rubber and the carcass, said belt layer containing cords extending in a direction inclined from the tire's circumferential direction,
wherein at least one circumferential reinforcement layer containing meandering cords extending generally along the tire's circumferential direction in a wavy or zigzag shape is provided radially outwardly or inwardly on the belt or between the belt layers, and at least one transversal reinforcement layer containing straight cords extending generally perpendicular to the tire's circumferential direction is provided on the position radially outwardly adjacent to the crown portion of the carcass,
wherein the ratio of the sum of the transversal strengths of the carcass, the transversal reinforcement layer, the circumferential layer and the belt including their coating rubbers to the sum of the circumferential strengths of them is 0.55 or more at the tire's equatorial plane.

2. A pneumatic tire, comprising:
a carcass containing at least one toroidal carcass ply,
a tread rubber arranged radially outwardly on the crown portion of the carcass, and
a belt consisting of at least one belt layer arranged between the tread rubber and the carcass, said belt layer containing cords extending in a direction inclined from the tire's circumferential direction,
wherein at least one circumferential reinforcement layer containing meandering cords extending generally along the tire's circumferential direction in a wavy or zigzag shape is provided radially outwardly or inwardly on the belt or between multiple belt layers, and
at least one transversal reinforcement layer containing straight cords extending perpendicular to the tire's circumferential direction is provided on the position radially outwardly adjacent to the crown portion of the carcass,
wherein the ratio of the sum of the transversal strengths of the carcass, the transversal reinforcement layer, the circumferential layer and the belt including their coating rubbers to the sum of the circumferential strengths of them is 0.55 or more at the tire's equatorial plane.

3. A pneumatic tire, comprising:
a carcass containing at least one toroidal carcass ply,
a tread rubber arranged radially outwardly on the crown portion of the carcass, and
a belt consisting of at least one belt layer arranged between the tread rubber and the carcass, said belt layer containing cords extending in a direction inclined from the tire's circumferential direction,
wherein at least one circumferential reinforcement layer containing meandering cords extending generally along the tire's circumferential direction in a wavy or zigzag shape is provided radially outwardly or inwardly on the belt or between multiple belt layers, and at least one transversal reinforcement layer containing straight cords extending generally perpendicular to the tire's circumferential direction is provided on the position radially outwardly adjacent to the crown portion of the carcass,
wherein the sum of the transversal strengths of the carcass, the transversal reinforcement layer, the circumferential reinforcement layer and the belt including their coating rubbers is 30 kN/25 mm or more at the tire's equatorial plane, and
wherein the ratio of the sum of the transversal strengths of the carcass, the transversal reinforcement layer, the circumferential layer and the belt including their coating rubbers to the sum of the circumferential strengths of them is 0.55 or more at the tire's equatorial plane.

4. The pneumatic tire according to claim 3, wherein the inclined angle of the straight cords of the transversal reinforcement layer with respect to the tire's circumferential direction is within a range of 90±20 degrees.

5. The pneumatic tire according to claim 3, wherein the belt consists of one belt layer, and the inclined angle of the cords of the belt layer with respect to the tire's circumferential direction is 10 to 60 degrees.

6. The pneumatic tire according to claim 3, wherein the belt consists of two or more belt layers; the cords of the adjacent belt layers cross each other; the inclined angle of the cords of the belt layers with respect to the tire's circumferential direction is 10 to 60 degrees; and the cords of the radially adjacent belt layers extend in the mutually opposite directions with respect to the tire's circumferential direction.

7. The pneumatic tire according to claim 3, wherein the width of the transversal reinforcement layer is 0.35 times or more as large as the tread width.

8. The pneumatic tire according to claim 3, wherein the width of the transversal reinforcement layer is 0.95 times or less as large as the tread width.

9. The pneumatic tire according to claim 3, wherein the straight cords constituting the transversal reinforcement layer are non-extensible cords.

10. The pneumatic tire according to claim 3, wherein the straight cords constituting the transversal reinforcement layer are extensible cords having an initial elongation of 0.2% or more.

11. The pneumatic tire according to claim 10, wherein the straight cords constituting the transversal reinforcement layer are extensible organic fiber cords.

12. The pneumatic tire according to claim 10, wherein the straight cords constituting the transversal reinforcement layer are extensible steel cords.

* * * * *